US008433868B2

(12) United States Patent
Nielsen et al.

(10) Patent No.: US 8,433,868 B2
(45) Date of Patent: Apr. 30, 2013

(54) CONCURRENT COPY OF SYSTEM CONFIGURATION GLOBAL METADATA

(75) Inventors: Karl A. Nielsen, Tucson, AZ (US); Richard A. Ripberger, Tucson, AZ (US); Jacob L. Sheppard, Queen Creek, AZ (US); Richard B. Stelmach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/692,674

(22) Filed: Jan. 25, 2010

(65) Prior Publication Data

US 2011/0185137 A1 Jul. 28, 2011

(51) Int. Cl.
*G06F 12/00* (2006.01)

(52) U.S. Cl.
USPC ........................................................ 711/162

(58) Field of Classification Search ................... 711/162
See application file for complete search history.

(56) References Cited

U.S. PATENT DOCUMENTS

| 7,290,168 | B1 | 10/2007 | DeKoning |
| 7,383,381 | B1 | 6/2008 | Faulkner et al. |
| 7,444,360 | B2 | 10/2008 | Frondozo et al. |
| 7,447,939 | B1 | 11/2008 | Faulkner et al. |
| 2008/0126952 | A1 | 5/2008 | Shohfi et al. |
| 2008/0313416 | A1 | 12/2008 | Frondozo et al. |

OTHER PUBLICATIONS

Michael F. Spear et al., "RingSTM: Scalable Transactions wiht a Single Atomic Instruction," ACM, 2008, pp. 275-284.
Alexandros Bartzas et al., "Enabling Run-Time Memory Data Transfer Optimizations at the System Level with Automated Extraction of Embedded Software Metadata Information," IEEE, 2008, pp. 434-439.

*Primary Examiner* — Yong Choe
*Assistant Examiner* — Hamdy S Ahmed
(74) *Attorney, Agent, or Firm* — Griffiths & Seaton PLLC

(57) ABSTRACT

Method, system, and computer program product embodiments for concurrent copy of system configuration global metadata in a data storage system are provided. In one exemplary embodiment, a global data rank is quiesced, followed by an unquiesce of the global data rank except for a global metadata area. The global metadata area is updated in memory, and then unquiesced. A current range of the global metadata area to be copied is quiesced. The current range of the global metadata area is copied from a source area to a target area. The current range is unquiesced. The steps of quiescing an additional current range, copying the range from a source area to a target area, and unquiescing the current range continue until the entire global metadata area has been copied.

23 Claims, 3 Drawing Sheets

CONCURRENT COPY OF SYSTEM CONFIGURATION GLOBAL METADATA

BACKGROUND OF THE INVENTION

1. Field of the Invention

The present invention relates in general to computers, and more particularly to a method, system, and computer program product for concurrent copy of system configuration global metadata in a data storage system in a computing environment.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

Generally, servers store data in mass storage subsystems that typically include a number of disk storage units. Data is stored in units, such as files. In a server, a file may be stored on one disk storage unit, or alternatively portions of a file may be stored on several disk storage units. A server may service access requests from a number of users concurrently, and it will be appreciated that it will be preferable that concurrently serviced access operations be in connection with information that is distributed across multiple disk storage units, so that they can be serviced concurrently. Otherwise stated, it is generally desirable to store information in disk storage units in such a manner that one disk drive unit not be heavily loaded, or busy servicing accesses, and while others are lightly loaded or idle. To provide redundancy and increase performance, many storage devices may be configured in a redundant array of independent disks (RAID) topology, where storage volumes are organized in RAID ranks.

A computer network of a business may have multiple storage networks that are located remote from one another and a business user. The storage networks may also be hosted on different types of systems. To perform the job correctly, the business user may require fast and reliable access to the data contained in all of the storage networks. Since access to this data occurs in real time, is desirable that storage operations (such as write or reads) occur as quickly as possible.

SUMMARY OF THE INVENTION

Information that describes how a storage system (including storage network information) is configured above the physical storage hardware itself is stored in a global metadata area. At the lowest physical level are storage devices, that when grouped together may be configured in the aforementioned RAID topology (RAID arrays). Device adapters may manage RAID arrays, for example. Above the RAID arrays, logical units such as storage ranks, logical subsystems (LSS), volumes, auxiliary volumes, and virtual ranks may be seen. The configuration of these logical entities above the RAID array level may be stored in global metadata. In addition, as copy services relationships (flash copy, peer-to-peer remote copy (PPRC), extended remote copy (XRC), etc.) are established between storage subsystems, information regarding these relationships may be stored in global metadata.

Global metadata, in one embodiment, may be mirrored on a set of three RAID arrays. If one of the physical arrays containing global metadata experiences degradations or access loss, or a new array with better characteristics to hold the metadata is configured, the global metadata must be moved to a new rank. The act of moving global metadata to a new rank involves copying all of the metadata from the primary copy to the target. During this copy, reads and writes to all of global metadata are quiesced, thus effectively blocking any new configuration requests or hardening of copy services global metadata for that duration. Other processes, such as Quick Init, may also be gated behind lengthy global data reassigns.

With heavy loads of input/output (I/O) due to elevator seek algorithms, a small amount of bandwidth is typically reserved for metadata I/O. Thus in systems running heavy amounts of I/O, a copy of global metadata (from source to target) can take upwards of 20+ minutes, which has shown in testing to cause suspends of copy services relationships. This can in turn cause effects that may be undesirable to the user.

In view of the foregoing, a need exists for a mechanism whereby a copy may be made of global metadata without the potential for undesirable effects previously described, such as a full suspension of metadata I/O. Accordingly, various method, system, and computer program product embodiments for concurrent copy of system configuration global metadata in a data storage system are provided. In one embodiment, a global data rank is quiesced, followed by an unquiesce of the global data rank except for a global metadata area. The global metadata area is updated in memory, and then unquiesced. A current range of the global metadata area to be copied is quiesced. The current range of the global metadata area is copied from a source area to a target area. The current range is unquiesced. The steps of quiescing an additional current range, copying the range from a source area to a target area, and unquiescing the current range continue until the entire global metadata area has been copied.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide for simultaneous global metadata copy while continuing to allow global metadata I/O. The mechanisms of the illustrated embodiments provide, in one example, for a full storage rank quiesce, followed by a partial unquiesce of all of the non-global metadata area. After the metadata area is quiesced, the list of global data ranks is modified, and the global metadata is fully unquiesced, allowing I/O to resume. Later, during the copy of the metadata from the primary rank to the target rank, a series of quiesce/copy/unquiesce sequences for specified ranges of the global metadata area is followed until the entire metadata area is copied.

The illustrated embodiments allow for simultaneous logical configuration, copy services, and other processes I/O (such as Quick Init) while a copy of metadata is in progress. The embodiments ensure that copy services processes, logical configuration, and other processes' work will not be queued behind long metadata copies brought about by heavy I/O demand and other factors such as the use of elevator seek algorithms in storage components such as the device adapter. The illustrated embodiments furthermore ensure that only the portion currently being copied is quiesced for I/O. This allows the speed of the physical storage media (upon which the RAID arrays are built, for example) to have minimal impact on the availability of global metadata reads and writes.

Figure 1:
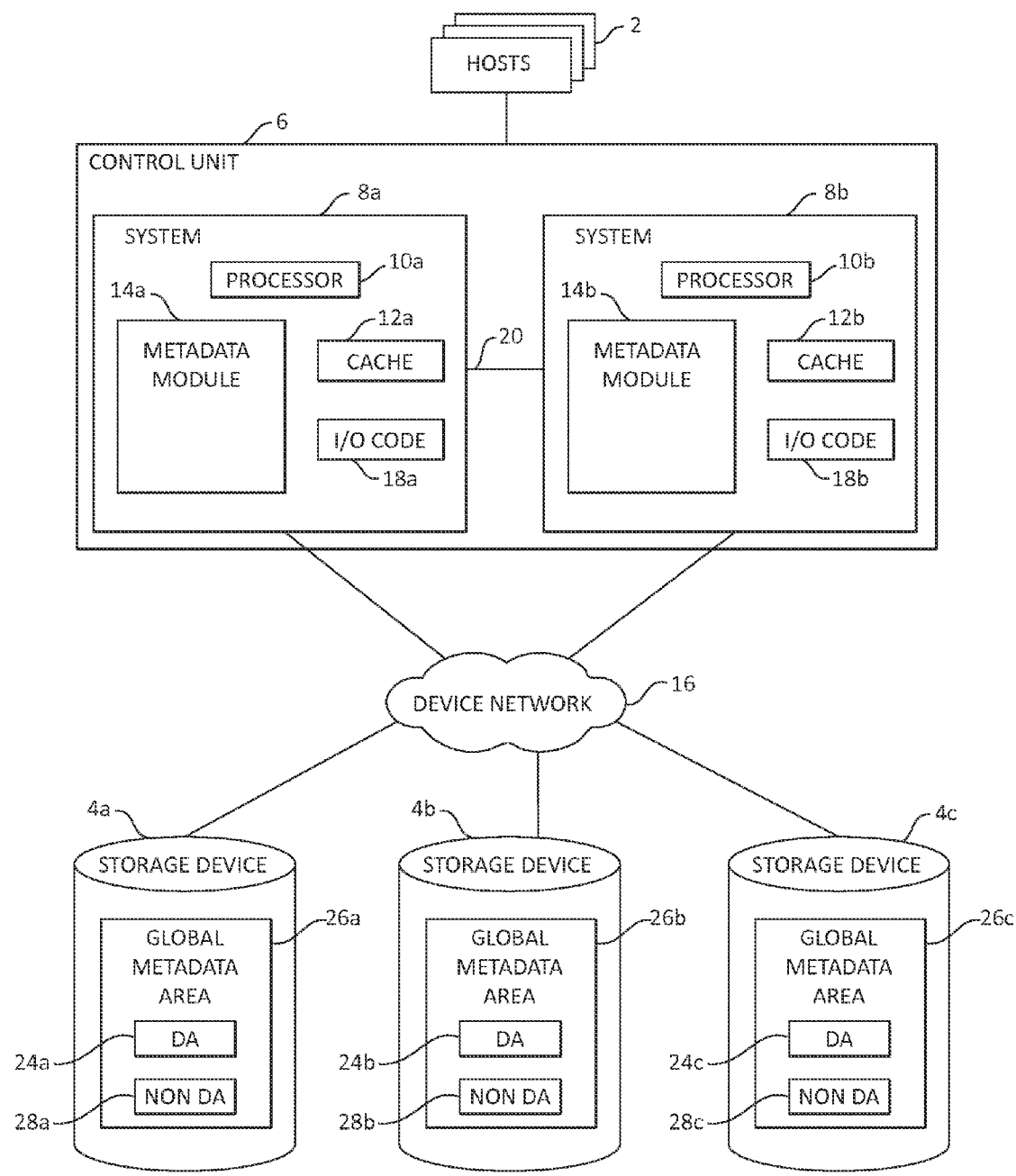
FIG. 1 is a block diagram of an exemplary computing environment in which aspects of the following description and claimed subject matter may be implemented.

FIG. 1 illustrates an embodiment of a computing environment in which aspects of the following description and claimed subject matter may be implemented. One or more hosts 2 communicate Input/Output (I/O) requests directed to storage devices 4a, 4b . . . 4n to a control unit 6, where the control unit 6 manages I/O access to the storage devices 4a, 4b . . . 4n. In one embodiment, the control unit 6 is comprised of two systems 8a, 8b, each including a processor 10a, 10b, a cache 12a, 12b, and a metadata module 14a, 14b. Each system 8a, 8b may be on separate power boundary. The two systems 8a, 8b may cooperate as a redundancy pair to perform the operation of the control unit such that in the event of a failure of either system, the remaining system takes over the operation of the control unit in a non-disruptive manner. The systems 8a, 8h may be assigned to handle I/O requests directed to specific volumes configured in the storage devices 4a, 4b . . . 4n. The systems 8a, 8b communicate with the storage devices 4a, 4h . . . 4n over a device network 16, which may comprise a local area network (LAN), storage area network (SAN), bus interface, serial interface, etc. The processors 10a, 10b execute I/O code 18a, 18b to perform I/O and metadata management operations described herein. The local storage 14a, 14b may comprise a memory or a memory that is loaded from a non-volatile storage device.

The control unit 6 may comprise any type of server, such as an enterprise storage server, storage controller, etc., or other device used to manage I/O requests to attached storage devices 4a, 4b . . . 4n, where the storage devices may comprise storage devices known in the art, such as interconnected hard disk drives (e.g., configured as a DASD, RAID, JBOD, etc.), magnetic tape, optical disks, electronic memory, etc. The hosts 2 may communicate with the control units 6 over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface. The processors 10a, 10b may communicate with each other over a connection 20 to handle failover or failback.

The systems 8a, 8b maintain global metadata information in global metadata areas 26a, 26b, and 26c. The metadata 24a, 24b, 24c may comprise critical metadata including critical configuration information needed for the control unit 6 to operate. If the critical metadata becomes corrupted or is unavailable, then the location and configuration of volumes on the storage devices may be lost and the control unit 6 may need to be reconfigured. As a result, redundant copies of the metadata are stored on devices 4b, 4c, and/or elsewhere. The storage devices 4a, 4b, 4c further include device adapter (DA) global metadata 24a, 24b, and 24c, as well as non-DA global metadata 28a, 28b, and 28c that the hosts 2 access through the global metadata areas 26a, 26b, and 26c. Non-DA global metadata 28a, 28b, and 28c, may include global metadata relating to copy services information, adapter platform information, and cache components.

Metadata modules 14a and 14b may be configured to carry out functionality according to the present invention as will be further described. For example, in the event that the global metadata area must be moved from a storage device (e.g., storage device 4a) to a new storage device (e.g., storage device 4n), the metadata modules 14a and 14b may operate in conjunction with processor 10a and other control unit 6 components to copy the global metadata area 26a by selectively quiescing ranges of the global metadata area to be copied, performing the copy of the metadata, unquiescing the current range, and selecting an additional range to be copied until the global metadata area has been subsequently copied. In some embodiments, the metadata modules 14a and 14b may operate to determine appropriate ranges of the global metadata area to quiesce at any one time, with a view to minimize any negative impact to I/O in the data storage system while maximizing performance (i.e., minimizing time to completion).

As one of ordinary skill in the art will appreciate, more than three storage devices (as shown) may exist, and certain storage devices may not include copies of the global metadata area. In one embodiment, three copies of global metadata are stored in one or more storage devices. In alternative embodiments, a different number of copies of metadata and signature data may be maintained.

Figure 2:
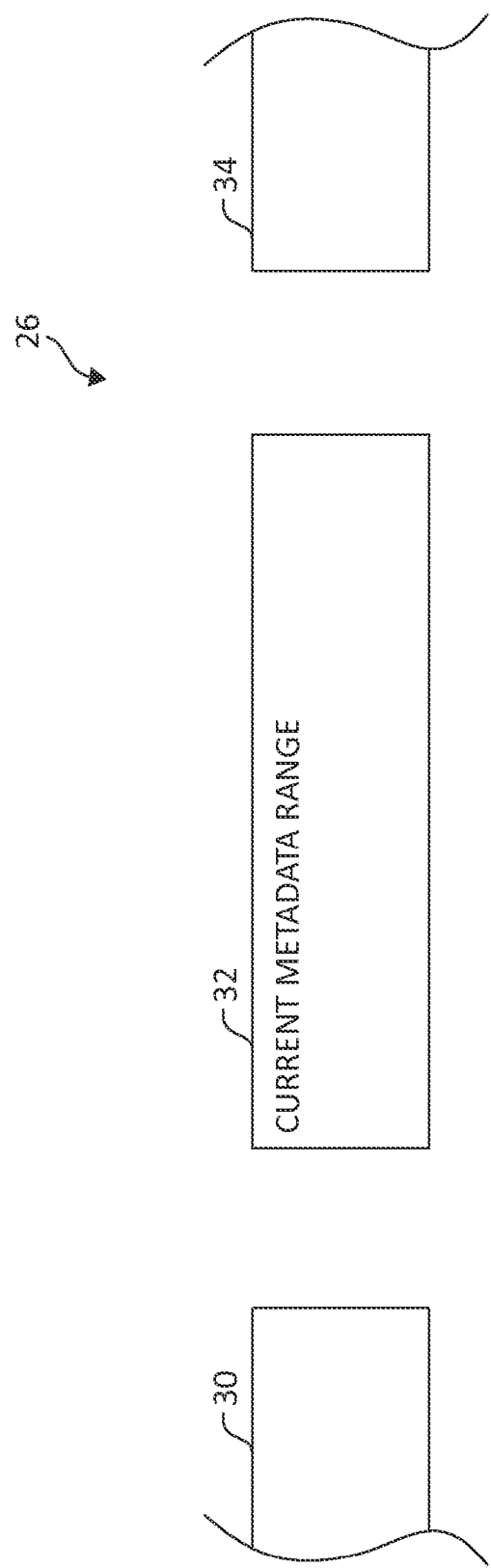
FIG. 2 is a block diagram of an exemplary current range of global metadata.

Turning now to FIG. 2, a block diagram of exemplary global metadata ranges in the global metadata area 26 are shown. The global metadata area 26 is segmented (either by the system 8a, 8b, the user, or both) into ranges appropriate for copy as previously described. A portion of a previously copied range 30 as well as an additional portion of a yet-to-be copied range 34 is depicted. The current metadata range 32 is also depicted. Current metadata range 32 is quiesced, while other metadata I/O is allowed to resume as previously described. One of ordinary skill in the art will appreciate that the size of the current range 32 may vary according to the particular implementation and other storage factors under consideration such as the speed of the underlying storage media.

Figure 3:
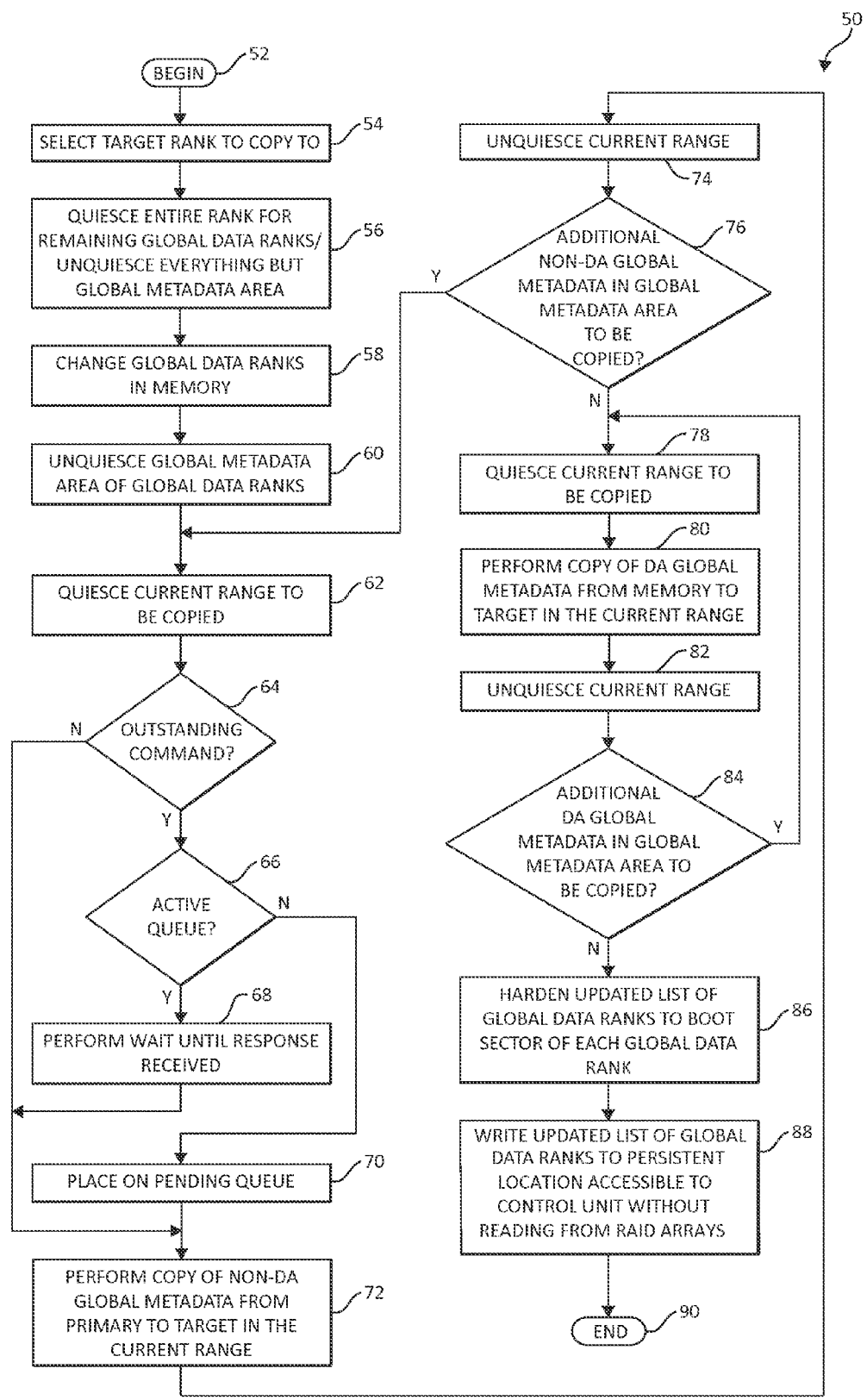
FIG. 3 is a flow chart diagram of an exemplary method for concurrent copy of system configuration global metadata.

Turning now to FIG. 3, a flow chart diagram of an exemplary method for concurrent copy of system configuration global metadata is depicted as method 50. As one of ordinary skill in the art will appreciate, various steps in the method 50 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 50 begins (step 52) with the selection of a target storage rank to which the global metadata area is copied, following a determination that the metadata should be moved (e.g., a determination of data degradation, access loss, or a new array having better storage characteristics) (step 54). The entire storage rank for the remaining global data ranks is quiesced, followed by unquiescing all but the global metadata area (step 56). The list of global data ranks is then updated in memory (step 58), and the global metadata area is then unquiesced (step 60).

According to aspects of the present invention, a current range of the global metadata area is then selected and quiesced to be copied (step 62). In conjunction with the quiescing of the metadata range, the method 50 queries if an outstanding command exists for metadata in the selected range (step 64). If no, the non-DA global metadata in the current range is coped from the primary to target areas (step 72). Returning to step 64, if an outstanding command is found, and determined to be on an active queue (step 66), the method performs a wait function until a response is received from the storage system (e.g., device adapter) that the command has been addressed (step 68), and step 72 continues as previously. If the outstanding command is found not to be on the active queue (again, step 66), the command is placed on the pending queue (step 70), and is driven after the quiesce operation.

While a complete copy of global metadata is being created on a rank (i.e., while each current range of the non-DA global metadata, and as will be further seen, each current range of the DA global metadata is copied), write updates to global metadata are written to all copies, including the copy being created. Read access to global metadata may be serviced from any copy of global metadata except the copy being created.

Once the copy of the non-DA global metadata in the current range is performed (again, step 72), the method 50 unquiesces the current range (step 74), and queries whether additional non-DA global metadata in the global metadata area remains to be copied (step 76). If so, the method returns to step 62 to quiesce an additional current range, and perform steps 64-74 as previously described. If all non-DA global metadata has been copied (again, step 76), the method moves to step 78, where the current range to be copied is selected and quiesced for DA global metadata. The DA global metadata in the selected range is copied from memory to the target in the current range (step 80), and the current range is unquiesced (step 82). If additional DA global metadata in other ranges in the global metadata area remains to be copied (step 84), the method returns to step 78 to quiesce an additional range, and perform the copy and unquiesce steps 80 and 82 as previously described.

If no additional DA global metadata remains to be copied (again, step 84), the method moves to step 86, where the updated list of global data ranks is hardened to the boot sector of each global data rank (step 86), and the updated list of global data ranks is written to a persistent location accessible to the control unit without the aid of reading from the storage devices (e.g., RAID arrays), such as a data file on a logical storage partition (step 88). The method 50 then ends (step 90).

In one embodiment of the present invention, the list of global data ranks that is updated when a new copy is initiated may be adapted to maintain an indication (e.g., an indicator bit) that the copy is incomplete, so that read access to that copy may be suppressed. Once the copy is determined to be complete (i.e., each of the various current ranges has been copied), the list of global data ranks is then updated to show that the copy is now currently a complete copy, and eligible for read accesses.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for concurrent copy of system configuration global metadata in a data storage system by a processor device, comprising:
   quiescing an entire global data rank of the data storage system;
   unquiescing the global data rank, except for a global metadata area of the global data rank;
   updating the global metadata area in memory;
   unquiescing the global metadata area of the global data rank of the data storage system;
   segmenting the global metadata area into a plurality of ranges appropriate for copying;
   selectin a current range from the plurality of ranges of the global metadata area to be copied;
   quiescing the selected current range of the global metadata area to be copied;
   copying the current range of the global metadata area from a source area to a target area; and
   unquiescing the current range and selecting an additional range from the plurality of ranges of the global metadata area to be copied until an entirety of the global metadata area has been copied.

2. The method of claim 1, wherein quiescing the current range, copying the current range, and unquiescing the current range is sequentially performed for each of an available plurality of ranges in the global metadata area until the global metadata area has been copied.

3. The method of claim 2, further including determining the available plurality of ranges in the global metadata area so as to minimize an impact of copying each of the available plurality of ranges on data storage operations while maximizing performance of the data storage system.

4. The method of claim 2, wherein copying the current range of the global metadata area includes performing one of copying non-device adapter (DA) global metadata from the source area to the target area for the current range and copying device adapter (DA) global metadata from a current range in memory to the target area for the current range, wherein copying the DA global metadata is performed subsequent to copying the non-DA global metadata.

5. The method of claim 2, further including maintaining an indicator during the copying the current range to designate the global metadata area is incomplete, and using the indicator to prevent a partial copy of the current range from being considered a complete copy if all valid copies are lost, and prevent reading of data from the partial copy.

6. The method of claim 1, wherein quiescing the current range of the global metadata area to be copied further includes determining if an outstanding command is issued for at least a portion of the current range of the global metadata area to be copied, wherein if the outstanding command is found on an active queue, a wait is performed until a response is received.

7. The method of claim 1, wherein copying the current range of the global metadata area includes copying non-device adapter (DA) global metadata from the source area to the target area for the current range.

8. The method of claim 1, wherein copying the current range of the global metadata area includes copying device adapter (DA) global metadata from a current range in memory to the target area for the current range.

9. A system for concurrent copy of system configuration global metadata in a data storage system, comprising:
   a processor device in communication with a memory device, wherein the processor device is adapted for:
     quiescing an entire global data rank of the data storage system,
     unquiescing the global data rank, except for a global metadata area of the global data rank,
     updating the global metadata area in memory,
     unquiescing the global metadata area of the global data rank of the data storage system,
     segmenting the global metadata area into a plurality of ranges appropriate for copying,
     selecting a current range from the plurality of ranges of the global metadata area to be copied,
     quiescing the selected current range of the global metadata area to be copied;
     copying the current range of the global metadata area from a source area to a target area, and
     unquiescing the current range and selecting an additional range from the plurality of ranges of the global metadata area to be copied until an entirety of the global metadata area has been copied.

10. The system of claim 9, wherein the processor device is further adapted for sequentially performing the quiescing the current range, the copying the current range, and the unquiescing the current range for each of an available plurality of ranges in the global metadata area until the global metadata area has been copied.

11. The system of claim 10, wherein the processor device is further adapted for, pursuant to copying the current range of the global metadata area, performing one of copying non-device adapter (DA) global metadata from the source area to the target area for the current range and copying device adapter (DA) global metadata from a current range in memory to the target area for the current range, wherein copying the DA global metadata is performed subsequent to copying the non-DA global metadata.

12. The system of claim 9, wherein the processor device is further adapted for, pursuant to quiescing the current range of the global metadata area to be copied, determining if an outstanding command is issued for at least a portion of the current range of the global metadata area to be copied, wherein if the outstanding command is found on an active queue, a wait is performed until a response is received.

13. The system of claim 9, wherein the processor device is further adapted for, pursuant to copying the current range of the global metadata area, copying non-device adapter (DA) global metadata from the source area to the target area for the current range.

14. The system of claim 9, wherein the processor device is further adapted for, pursuant to copying the current range of the global metadata area, copying device adapter (DA) global metadata from a current range in memory to the target area for the current range.

15. The system of claim 9, wherein the processor device is further adapted for maintaining an indicator during the copying the current range to designate the global metadata area is incomplete, and using the indicator to prevent a partial copy of the current range from being considered a complete copy if all valid copies are lost, and prevent reading of data from the partial copy.

16. A computer program product for concurrent copy of system configuration global metadata in a data storage system, the computer program product comprising a non-transitory computer-readable storage medium having computer-readable program code portions stored therein, the computer-readable program code portions comprising:

a first executable portion for quiescing an entire global data rank of the data storage system;

a second executable portion for unquiescing the global data rank, except for a global metadata area of the global data rank;

a third executable portion for updating the global metadata area in memory;

a fourth executable portion for unquiescing a global metadata area of global data ranks of the data storage system;

a fifth executable portion for segmenting the global metadata area into a plurality of ranges appropriate for copying, a sixth executable portion for selecting a current range from the plurality of ranges of the global metadata area to be copied, a seventh executable portion for quiescing a current range of the global metadata area to be copied;

an eighth executable portion for copying the current range of the global metadata area from a source area to a target area; and a ninth executable portion for unquiescing the current range and selecting an additional range from the plurality of ranges of the global metadata area to be copied until an entirety of the global metadata area has been copied.

17. The computer program product of claim 16, further including a tenth executable portion for sequentially performing the quiescing the current range, the copying the current range, and the unquiescing the current range for each of an available plurality of ranges in the global metadata area until the global metadata area has been copied.

18. The computer program product of claim 17, further including an eleventh executable portion for determining the available plurality of ranges in the global metadata area so as to minimize an impact of copying each of the available plurality of ranges on data storage operations while maximizing performance of the data storage system.

19. The computer program product of claim 17, further including an eleventh executable portion for, pursuant to copying the current range of the global metadata area, performing one of copying non-device adapter (DA) global metadata from the source area to the target area for the current range and copying device adapter (DA) global metadata from a current range in memory to the target area for the current range, wherein copying the DA global metadata is performed subsequent to copying the non-DA global metadata.

20. The computer program product of claim 17, further including an eleventh executable portion for maintaining an indicator during the copying the current range to designate the global metadata area is incomplete, and using the indicator to prevent a partial copy of the current range from being considered a complete copy if all valid copies are lost, and prevent reading of data from the partial copy.

21. The computer program product of claim 16, further including a tenth executable portion for, pursuant to quiescing the current range of the global metadata area to be copied, determining if an outstanding command is issued for at least a portion of the current range of the global metadata area to be copied, wherein if the outstanding command is found on an active queue, a wait is performed until a response is received.

22. The computer program product of claim 16, further including a tenth executable portion for, pursuant to copying the current range of the global metadata area, copying non-device adapter (DA) global metadata from the source area to the target area for the current range.

23. The computer program product of claim 16, further including a tenth executable portion for, pursuant to copying the current range of the global metadata area, copying device adapter (DA) global metadata from a current range in memory to the target area for the current range.

* * * * *